(12) United States Patent
Jacobson et al.

(10) Patent No.: US 7,594,448 B2
(45) Date of Patent: Sep. 29, 2009

(54) CRAWLER FOR INSPECTING PIPES

(75) Inventors: Dwight W. Jacobson, Farmington, NM (US); Paul M. Jacobson, Rio Rancho, NM (US); Jon D. Jacobson, Irvine, CA (US)

(73) Assignee: Fabtec Solutions, LLC, Farmington, NM (US)

( * ) Notice: Subject to any disclaimer, the term of this patent is extended or adjusted under 35 U.S.C. 154(b) by 88 days.

(21) Appl. No.: 11/937,193

(22) Filed: Nov. 8, 2007

(65) Prior Publication Data
US 2009/0120215 A1 May 14, 2009

(51) Int. Cl.
*G01M 19/00* (2006.01)
(52) U.S. Cl. .................................... 73/865.8
(58) Field of Classification Search ............... 73/865.8, 73/618, 622; 250/358, 360.1
See application file for complete search history.

(56) References Cited

U.S. PATENT DOCUMENTS

| | | | |
|---|---|---|---|
| 3,764,806 A | 10/1973 | Redmayne | 378/60 |
| 3,891,845 A | 6/1975 | English | 378/58 |
| 4,435,829 A | 3/1984 | Siler et al. | 378/60 |
| 4,999,500 A | 3/1991 | Breskin et al. | 250/385.1 |
| 5,362,962 A | 11/1994 | Barborak et al. | 250/234 |
| 5,420,427 A | 5/1995 | Morgan et al. | 250/360.1 |
| 5,614,720 A | 3/1997 | Morgan et al. | 250/360.1 |
| 5,698,854 A | 12/1997 | Gupta | 250/358.1 |
| 6,925,145 B2 | 8/2005 | Batzinger et al. | 378/59 |
| 2002/0036108 A1* | 3/2002 | Jeswine et al. | 180/164 |
| 2003/0070852 A1* | 4/2003 | Angott | 180/168 |
| 2005/0041775 A1 | 2/2005 | Batzinger et al. | 378/59 |
| 2006/0078091 A1 | 4/2006 | Lasiuk et al. | 378/198 |

* cited by examiner

*Primary Examiner*—Hezron Williams
*Assistant Examiner*—Tamiko D Bellamy
(74) *Attorney, Agent, or Firm*—Dennis F. Armijo

(57) ABSTRACT

Robotic external pipeline crawler system employs the use of logic control to provide a system capable of constantly and accurately maintaining a position at the vertex of the pipe. This apex positioning can be maintained as it traverses the length of the pipe being inspected. This system is adaptable to both straight and curved pipe, multiple pipe diameters, and will substantially reduce set up time and vertical pipeline support crossing time. The crawler system also employs an advanced bracketry system which allows quick disconnecting and auxiliary powered movement allowing for decreased cycle time across pipe supports. The unique tire interface allows for additional surface area contact making extreme environmental conditions possible.

17 Claims, 7 Drawing Sheets

CRAWLER FOR INSPECTING PIPES

BACKGROUND OF THE INVENTION

1. Field of the Invention (Technical Field)

The embodiments of the present invention relate to pipe inspection and more particularly to a method and apparatus for using and controlling a crawler to inspect the integrity of installed pipes.

2. Background Art

Pipelines are used around the world to transport fluids for a multitude of applications including refineries and power plants. The failure of these pipelines can cause not only a loss of the transported fluid but also injury to persons and the environment. Thus, the integrity of the pipelines must be periodically checked to avoid failures. Unfortunately, the pipes cannot be visually inspected because the failures are due to internal damage and secondly pipelines usually have an insulating layer disposed on the pipe preventing any type of visual inspection. These failures are caused by deterioration over time due to erosion or corrosion. Various methods have been used to measure the thickness of the pipes to predict or detect possible failures. These methods include ultrasonic, x-ray and gamma ray detection methods. An apparatus or vehicle is necessary to apply these detection methods in the field. These vehicles need to operate on a variety of different sized pipes, pipes in many configurations and in some cases, must survive extreme environmental conditions. In addition, the vehicle must be easy to operate with minimal assistance and without highly qualified or technical support.

There are presently two types of vehicles used for failure detection. The first is a vehicle that is inserted into the pipe and travels along the interior of the pipe. These devices are discussed in U.S. Pat. No. 4,435,829 and U.S. Pat. No. 3,764,806. These systems have several obvious disadvantages, such as inserting the vehicle and gathering the data that is generated. The fluid delivery is usually curtailed or stopped during measurements. The second type of system is the provision of a vehicle that travels along side of the exterior of the pipe, as discussed in US Patent Application No. 2006/0078091A1 or vehicles that encase or travel on the pipe. U.S. Pat. No. 5,698,854 describes a vehicle that travels on the apex of a pipe to carry pipe analysis equipment. This system uses one or two motors to drive the vehicle on the pipe, but does not teach or imply any type of stabilization or steering system. The device merely is driven down the pipe with a motor driving the front wheels and a separate motor driving the rear wheels. Currently, most vehicles for carrying the detection devices use outrigger supports to stabilize the crawler's movements. The supports include a separate wheel mechanism on an adjoining pipe or on a separate vehicle traveling on the ground in order to keep the vehicle near the apex of the pipe during operation. If the crawler is not located precisely at the apex, a center referenced scan will not be obtained. Without the use of outriggers, the crawler will bind or fall off the pipe, causing significant delays in inspections. This methodology for stabilizing and controlling the crawler's movements, limits the functionality to only straight pipeline sections. Any bends/corner sections of the pipeline cannot be tested. Further, partial disassembly and reassembly of the vehicle components is required at every support junction of the pipeline. Using these prior art systems the vehicle can only be approximately positioned at the vertex of the pipe. Disassembly and reassembly significantly reduces the amount of productivity with regard to the total amount of time required to perform an inspection from start to finish.

The main disadvantage of current technology is the need for external supports to help guide the crawler down the pipeline. The current drive method uses a linear DC voltage supply to drive both motors at approximately the same speed. Linear DC voltage supplies are very large and heavy, so it is required to carry the supply in a truck with the operator that is analyzing the corrosion data. No adjustment on wheel angle was utilized for traction enhancement of driver wheels resulting in frequent slippage, which is detrimental to final scan quality. Scanning equipment brackets must be disassembled at each vertical pipe support crossing. Using extraneous equipment, the external supports, requires a significant amount of time to setup and provide no benefit to the actual corrosion data being analyzed. This method requires more equipment than needed, a longer setup and break down time, and data measurements that are never oriented to a true vertical. This setup also causes unbalanced wear on the system.

A constant positioning and realignment control loop system is necessary to solve the problems outlined above and is essential to maintain positioning on the apex of the pipe. This gives an accurate mapping of the corrosion damage. Drive wheel traction remains a problem in previous designs. Substantial time is required for disassembly and re-assembly of scanning equipment. The current crawlers will bind or drive off the pipeline. Because of this the current setup cannot function without the use of external guides, or outrigger supports. The present invention requires minimal setup and no external supports. The present invention has the ability to cross over supports without significant disassembly which allows for considerable improvements in process productivity. Further, curved sections of pipe that were previously unable to be inspected can be checked giving a significant amount of inspection coverage that was not possible in the prior art.

SUMMARY OF THE INVENTION (DISCLOSURE OF THE INVENTION)

The embodiments of the present invention solve the aforementioned problems by providing a system to automatically keep a crawler on the apex of a pipe. An inclinometer provides an electrical signal proportional to the angle at which the crawler is currently oriented on the pipe. This electrical signal is sent back to the Control Panel Unit where it is configured and fed through the control algorithm. The Control Software then returns a set of signals used to provide control for both the right and left motors. These control signals are then sent back to the Driver Unit where they are translated into their respective motor speeds. Driving one motor faster than the other will allow the crawler to respond by driving back up the pipe wall to correct the mechanical angle of the inclinometer, thus keeping the crawler on the apex of the pipe. Support brackets attached to the crawler allow for mounting of a radiation source, a radiation camera, and automated movement for obstacle clearance. Automated equipment may include electrical or pneumatic actuators used onboard to improve scanning cycle time.

An object of the embodiments of the present invention is to provide a vehicle for carrying a pipe inspection device on the apex of a pipe that is self-guiding and self-correcting.

An advantage of the embodiments of the present invention is that they have the ability to self-correct or navigate on various diameter pipes.

Another advantage of the embodiments of the present invention is that they require less human interaction during operation.

Another advantage of the embodiments of the present invention is that they provide more consistent radiography data by automatically self-guiding at the apex of the pipe.

Another advantage of the embodiments of the present invention is that they provide data position logging.

Yet another advantage of the embodiments of the invention is that they provide for automated movement of radiography components after assembly.

Other objects, advantages and novel features, and further scope of applicability of the embodiments of the present invention will be set forth in part in the detailed description to follow, taken in conjunction with the accompanying drawings, and in part will become apparent to those skilled in the art upon examination of the following, or may be learned by practice of the invention. The objects and advantages of the disclosed embodiment of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
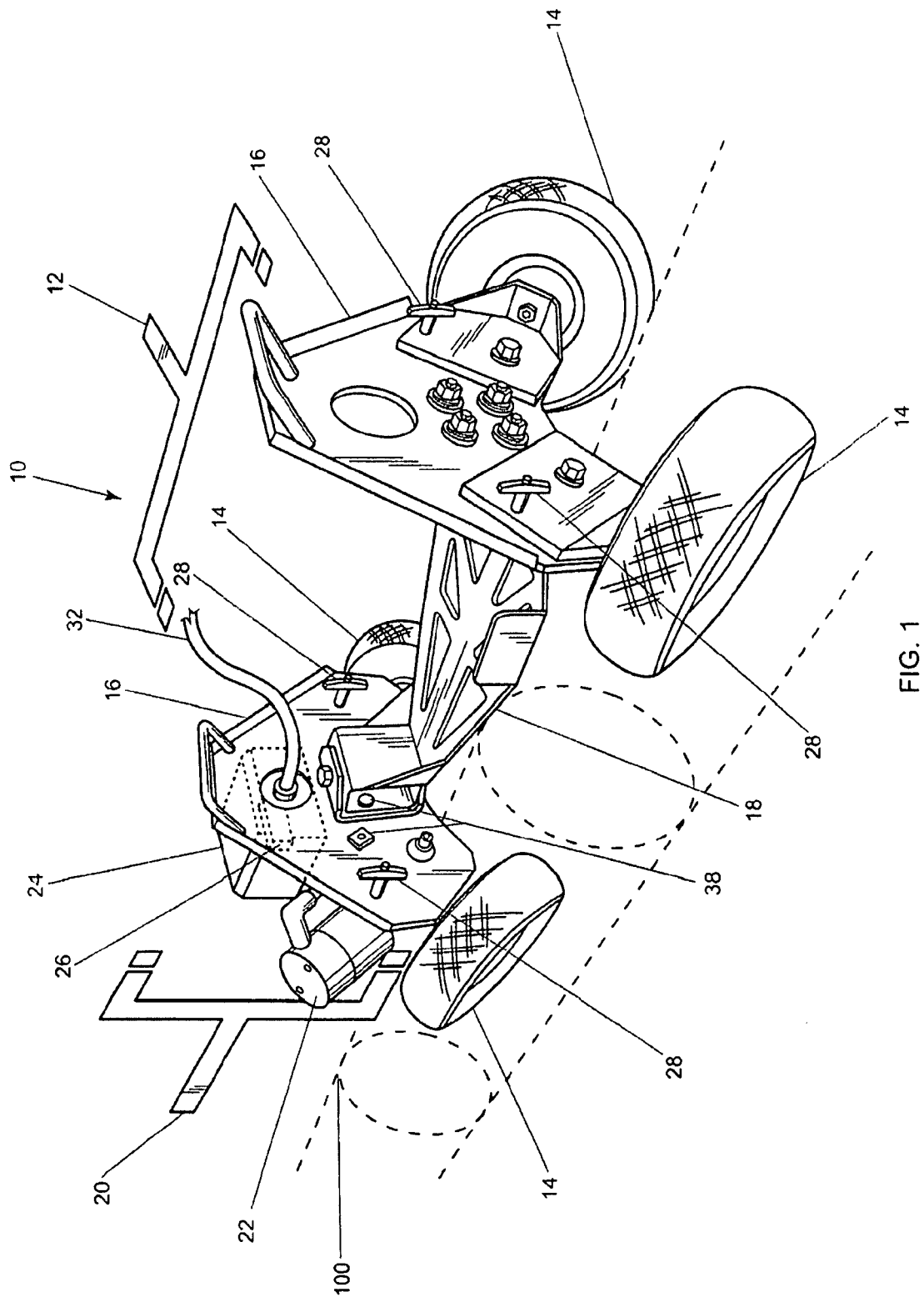
FIG. 1 is a perspective view of the crawler.
Figure 5:
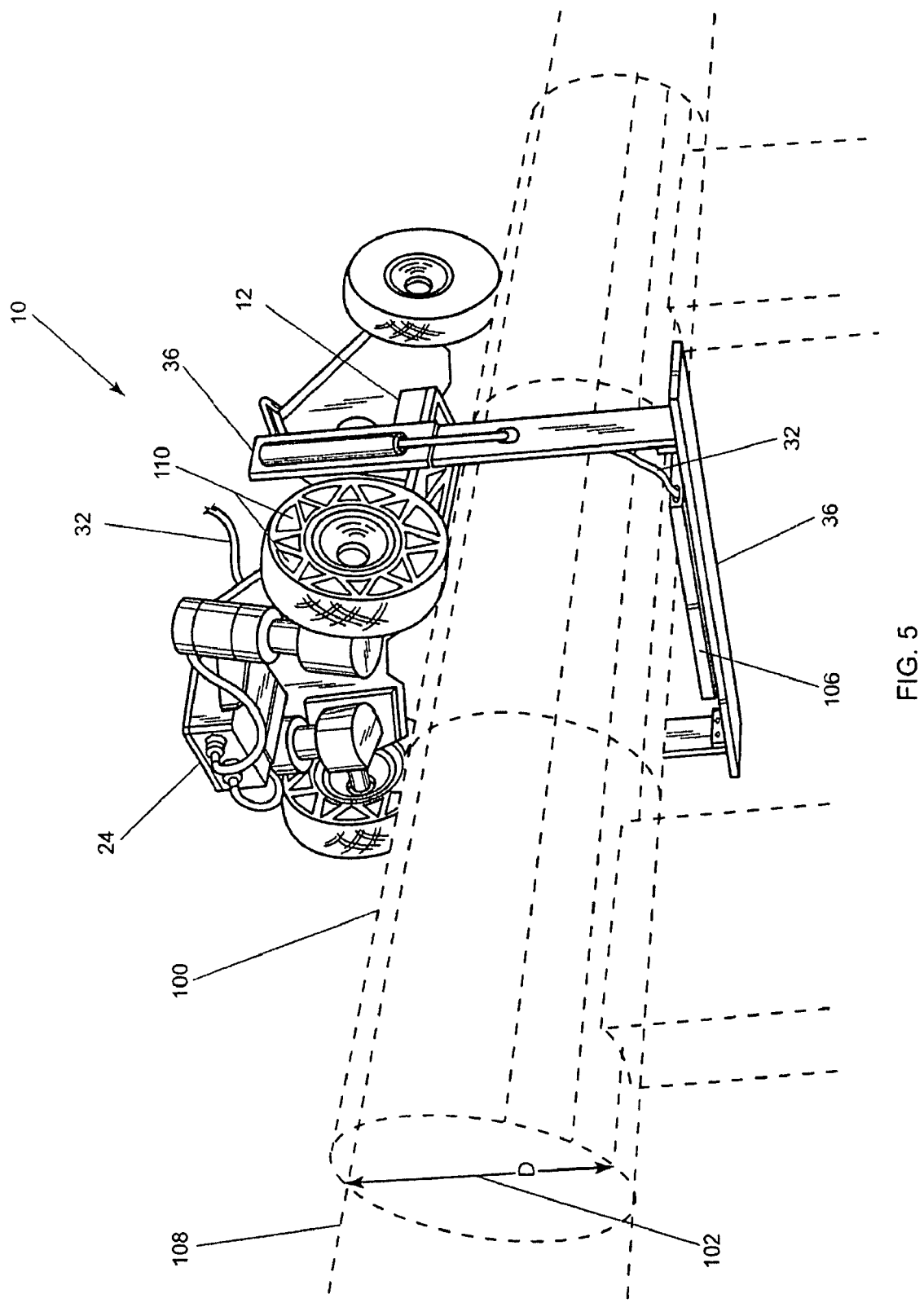
FIG. 5 shows the crawler on a pipe to be inspected.

FIG. 1 shows a perspective view of the crawler. Crawler 10 has chassis 12 which rides on four (4) tires 14. Chassis 12 comprises end plates 16 and a frame 18 which make up the base of the crawler system. Tires 14 are preferably constructed for traction on a pipe surface 100. Tires 14 are solid tires with material removed 110, as shown in FIG. 5, by water jet, drilling, or other material removal to allow for damping and increase tire to pipe surface contact. Although solid tires are discussed, air or other fluid filled tires can be used with varying types and designs of tread patterns, with or without magnetic qualities, or in the alternative a track driving system could be employed (not shown). Crawler 10 further comprises drive system 20 which contains one or more drive motors 22 used for forward motion and steering. For the embodiment shown, two (2) drive motors 22 are shown independently driving front tires 14. However, this disclosure is intended to include a separate drive motor for driving a separate tire or any other combination. Electronics unit (EU) 24 comprises motor driver electronics, heater, position sensor 26, and interface electronics. EU 24 can be comprised of one or more assemblies. Position sensor 26, like an inclinometer or gyro device, is used for measuring tilt angles of crawler 10. However, multiple positioning sensors can be used on either the same axis for a differential measurement or in a ninety degree (90°) configuration along the horizontal plane. For the embodiment shown, one (1) sensor 26 is used for the specified control flow.

Figure 2:
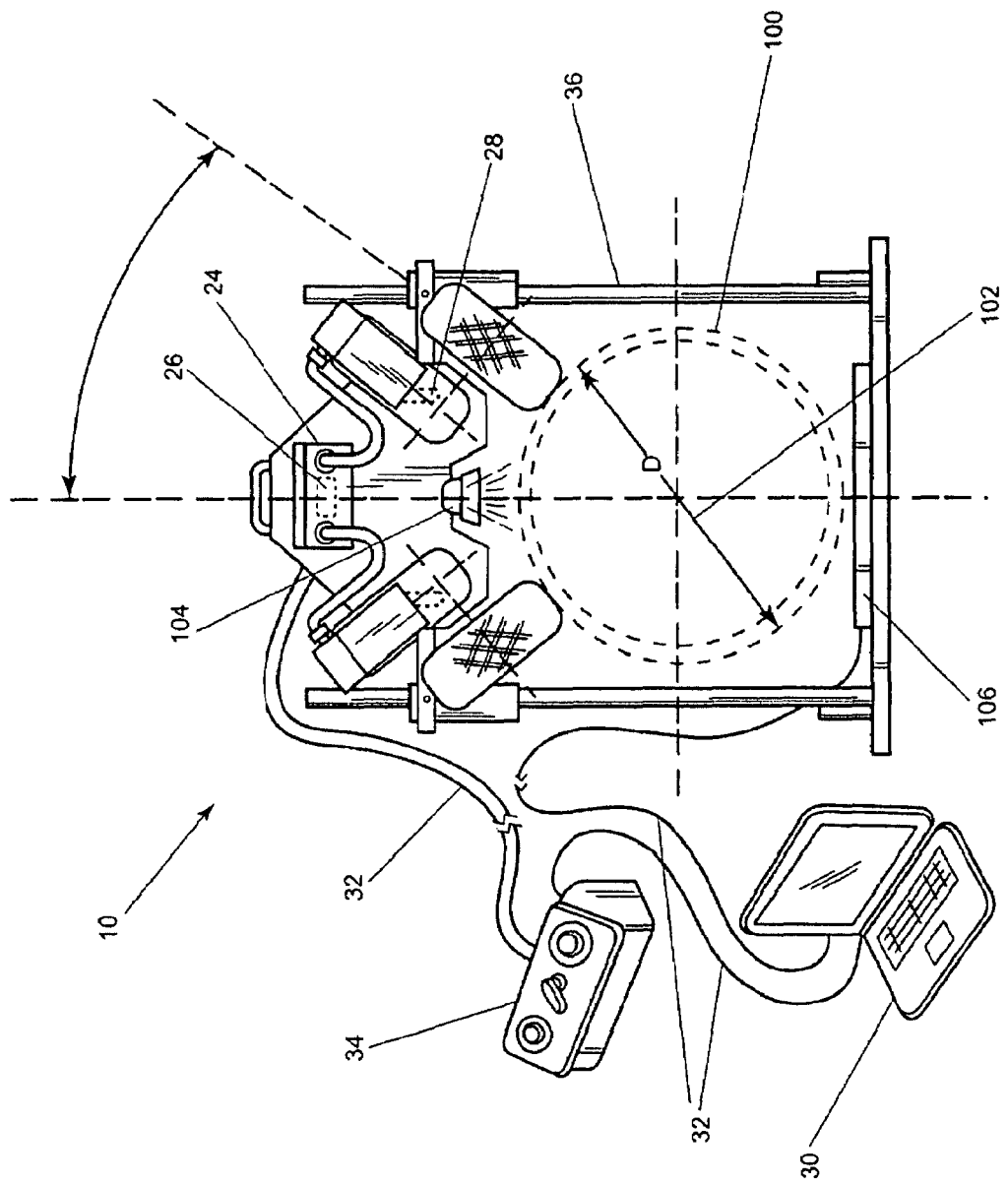
FIG. 2 is a front view of the crawler on a pipe.

FIG. 2 is a front view of the crawler facing the front of the crawler. As shown in FIGS. 1 and 2, cable assembly 32 sends control signals and data from EU 24 to control unit 34. Although this disclosure describes a cable assembly, a wireless system with transmitters and receivers can be used (not shown). Control unit 34 preferably contains all electronics and hardware needed to provide the user/computer interface to operate crawler 10. A computer 30 or the like, is used to display the current status of the crawler. Crawler 10 also preferably contains a radiographic equipment support bracket system 36 which is used to mount all radiography equipment. Support bracket system 36 can also allow for automatic movement of the radiography equipment onboard, once mounted. Power can be supplied to the crawler via an umbilical cord or by battery (not shown). Crawler 10 can be equipped with mechanical micro adjustments 38 that can be used to optimize the travel. These adjustments 38 limit travel on 2 axis including z-axis (twist) and y-axis (side to side). Adjustments are made using rotatable stop blocks and adjustable stop bolts, respectively, located at the pivot point of crawler 10 shown in FIG. 1.

By relocating adjusting pins 28, crawler 10 can be adjusted to operate on different sized pipes. For example, the embodiment shown can be used on eight to thirty (8-30") inch diameter pipes. Other diameter pipes may also be accommodated with minor design changes. The capability for making these adjustments maximizes tire 14 contact with pipe 100 providing the maximum amount of traction for steering enhancement, data position logging and radiographic image consistency.

The embodiments of the present invention provide solutions to the problems as set out in the background art section of this application and improves on the present systems by overcoming their shortcomings. Self-steering allows for elimination of outriggers, decreased setup time, minimal human interaction once setup, and navigation of corners. Tire material removal 110 allows for shock absorbing, increased surface contact area, and improved traction. Chassis design allows for setting tires or tracks to near perpendicular contact to pipeline 100. Support bracket system 36 allows for improved setup time and automated positioning movement once assembled.

One feature of the embodiments of the present invention is the control software which uses a combination of Proportional-Integral-Derivative Controller (PID Controller) algorithms. Other types of control algorithms can be used, thus the embodiments disclosed herein are not meant to limit the types of control algorithms to PID controllers. The software also implements some front-end digital filtering of the position sensor data prior to being used in the algorithms. The software is configurable and the control loops can be retuned to allow for any mechanical variations (i.e. changes in designs). The software can be written using commercial graphical based software coding packages, such as LabVIEW from National Instruments. Other well-known types of coding packages can be used, thus the embodiments disclosed herein are not meant to limit the types of coding packages to graphical based packages.

The method for steering and guiding the crawler is shown in FIGS. 3A, 3B, 3C and 4. As the crawler is energized and set in forward motion, a start sequence 40 is commenced, the horizontal angle of the drive unit is measured, $\theta_1$ 42 by position sensor 26, which is located inside the enclosure rigidly attached to the main frame of the drive unit. The measurement is then sent back to the control unit in preparation to be used in the control algorithm. The software then filters the information and applies a gain compensation to the horizontal angle measurement, $\theta_{1prime}$ 44. The angle measurement is displayed to the operator 46 for reference as the software continues to process the data by acquiring the level calibration factor, $\theta_2$ 48. This level calibration factor is used to adjust out for any mechanical offsets. The angle measurement and the calibration factor are summed as a control loop input summation, $\theta_{1prime}+\theta_2=\theta_3$ 50. The summation is distributed to two PID control algorithms for independent motor control 52. Independent PID control is used for controlling right 54 and left 68 motors.

Figure 3A:
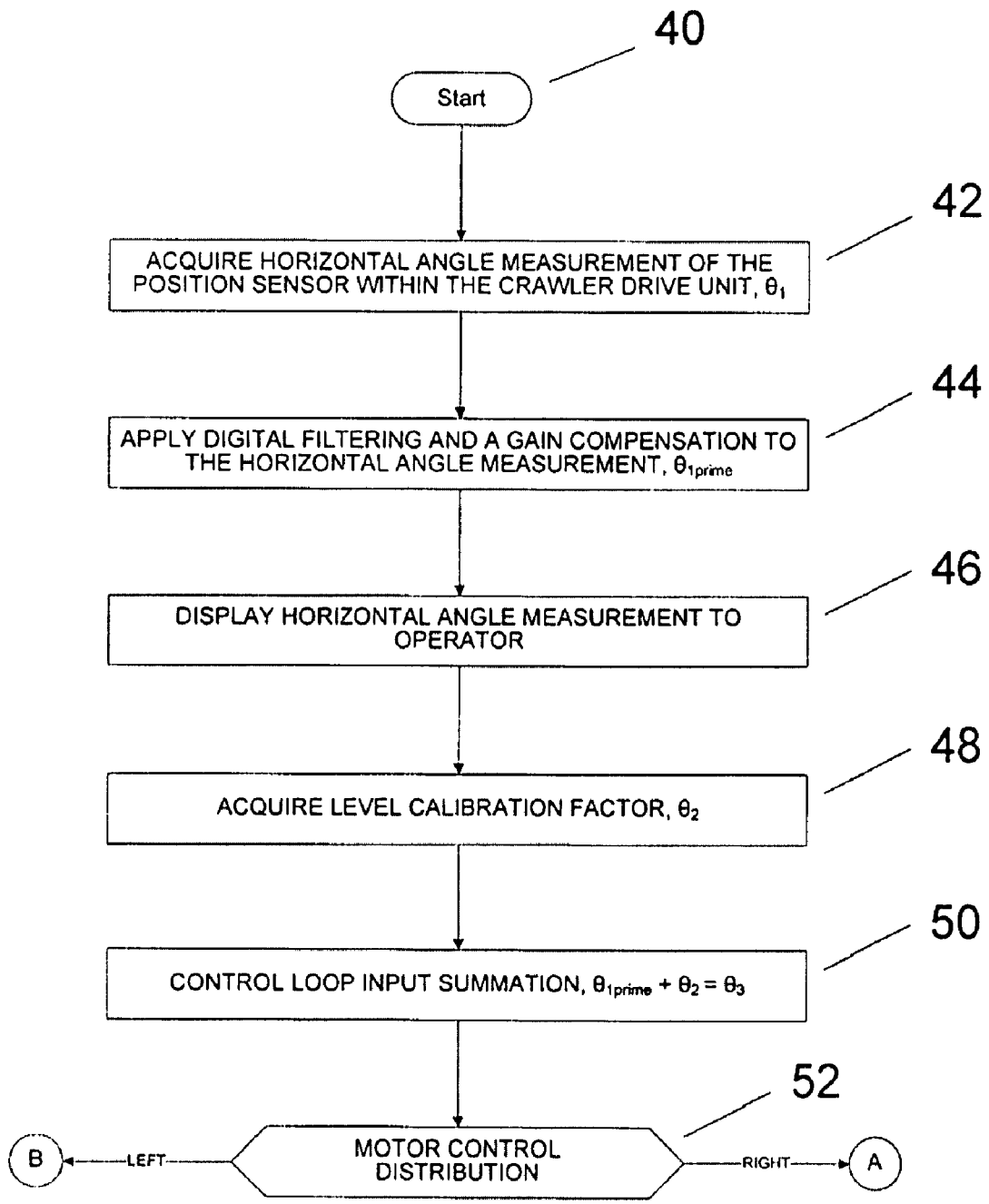
FIG. 3A is a flowchart showing the method for steering and guiding the crawler.
Figure 3B:
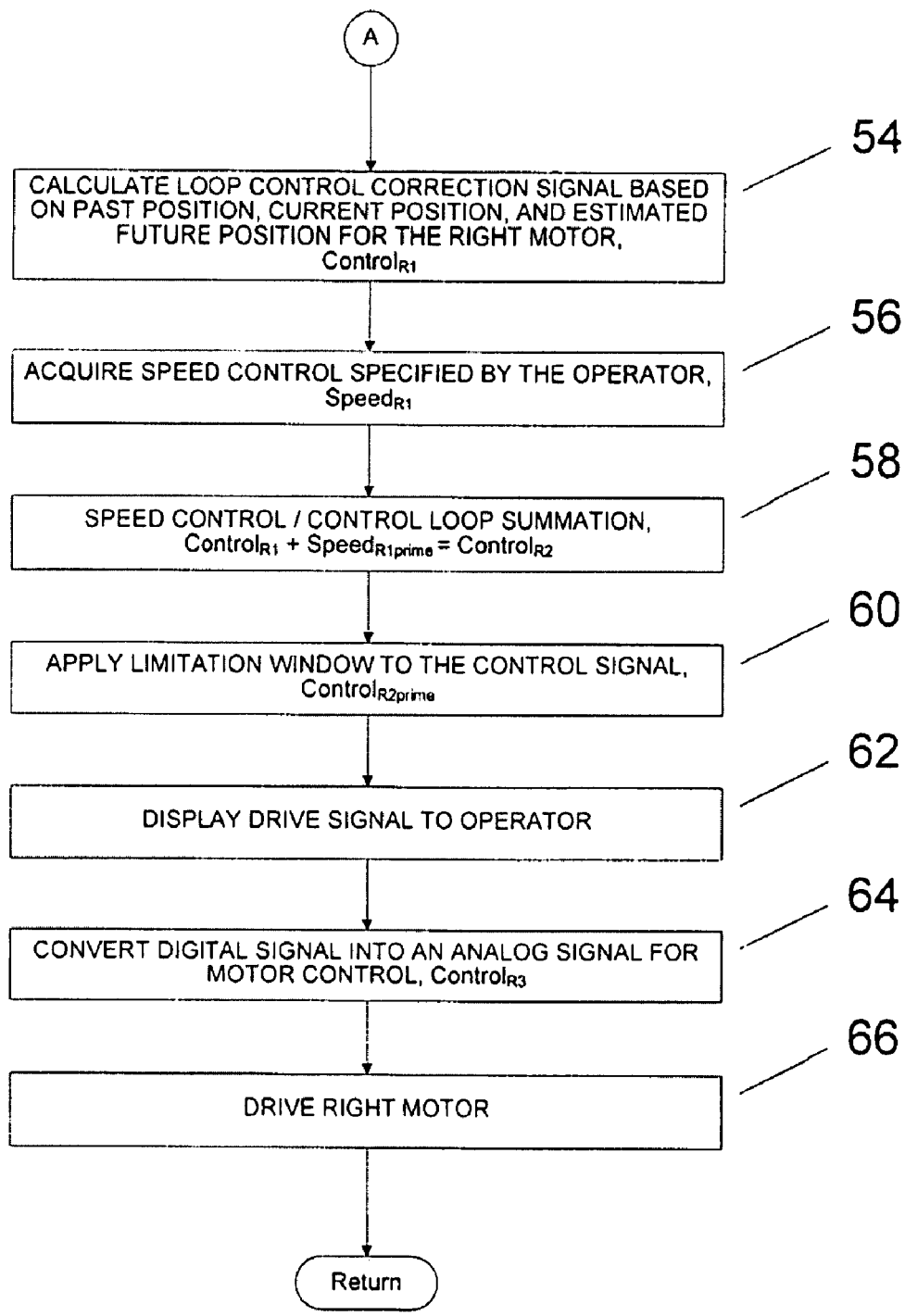
FIG. 3B is a continuation of the flowchart of 3A for the right motor.
Figure 3C:
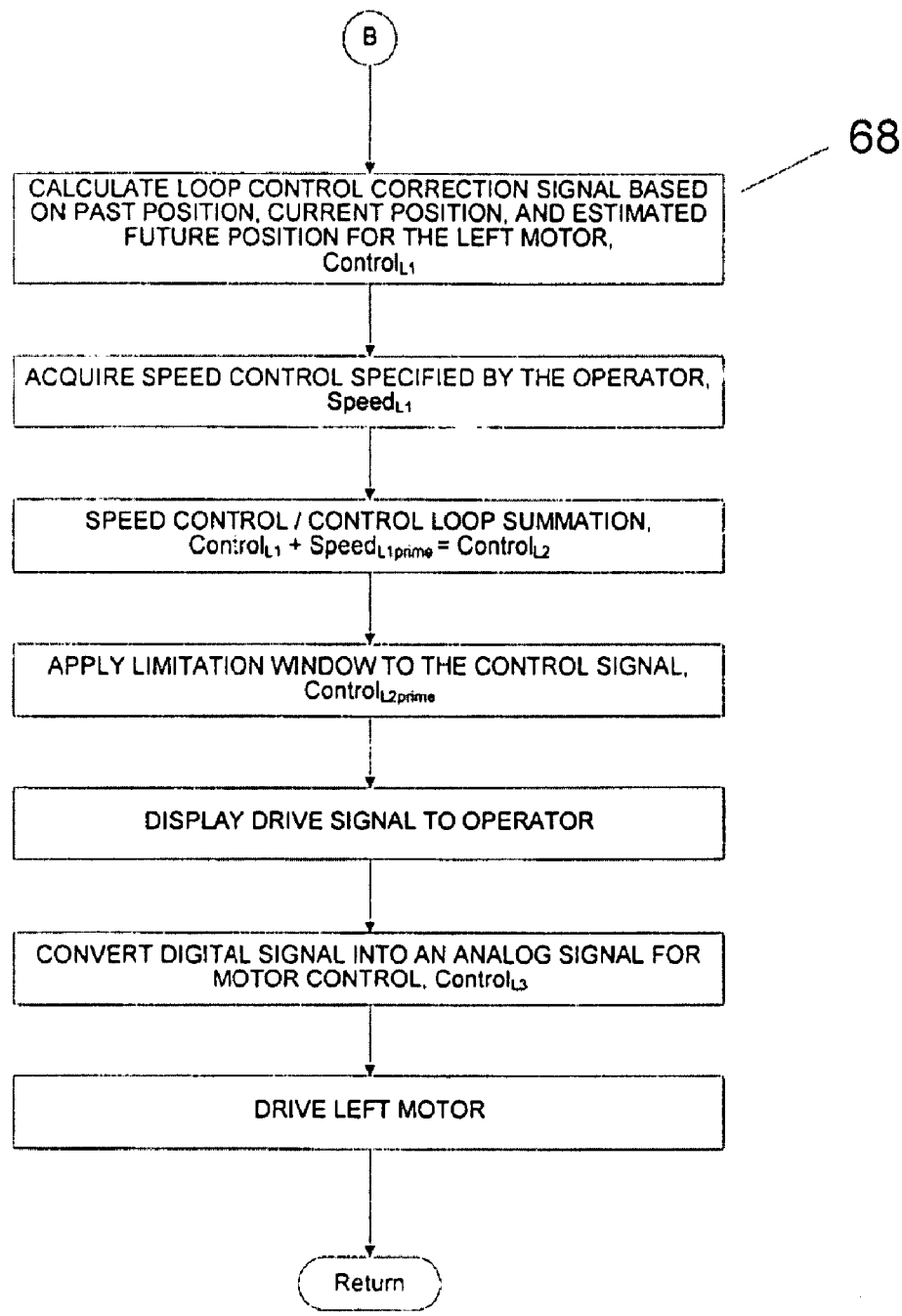
FIG. 3C is a continuation of the flowchart of 3A for the left motor.
Figure 4:
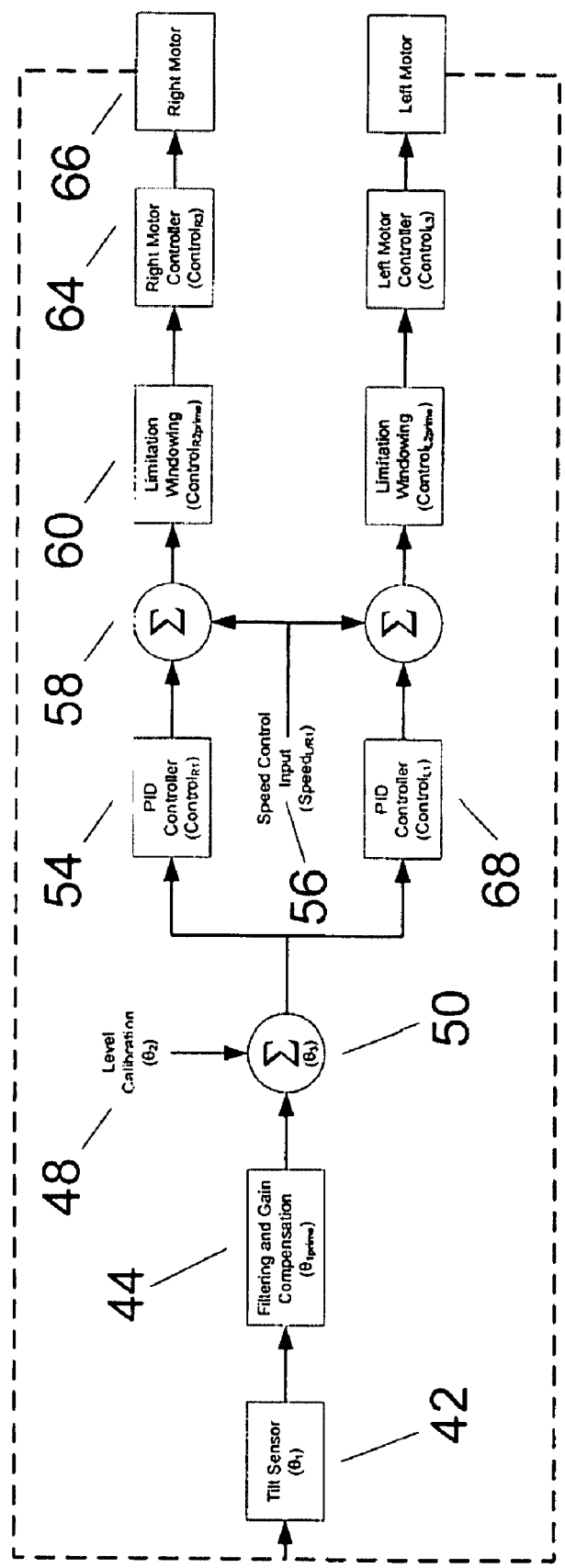
FIG. 4 is a signal representation chart of the steering embodiment of the present invention.

As shown in FIGS. 3B, 3C and 4, this process continues and is the same for the left and right motor. Thus the right motor process shall be discussed and the process for the left is exactly the same and need not be repeated, however the left motor process is shown in FIG. 3C. As the orientation data is processed, the historical, current and estimated future positions of the drive unit are taken into consideration by the software, $Control_{R1}$ 54. The speed control setting is acquired from the operator control, $Speed_{R1}$ 56. The speed control is summed with the control loop data, $Control_{R1}+Speed_{R1}=Control_{R2}$ 58. A limitation window is then applied to the control signal, $Control_{R3}$ 60 and the drive signal is displayed to operator 62. The digital signal is converted to an analog signal for motor control 64 and used by the motor drive electronics to drive right motor 66. By using this process for determining how much of a correction factor should be induced to each of the motors, the system avoids over correction or under correction. This process results in a critically-damped control system that produces a straight-line travel path and eliminates the potential of the drive unit to wander or travel down the pipe in a sine-wave type pattern. Failure to accomplish this would result in skewed imagery of the targeted segments of the scanned pipe.

An example to show one possible cycle through this control scenario is if the crawler was initially placed three degrees (3°) to the right off the center of the pipe's apex and the total rigid mechanical offset of the position sensor was 0.2 degrees to the right from a true gravitational vertical, the position sensor would initially measure 3.2 degree to the right of the pipe's center. This measurement would be filtered by the software then adjusted by the level calibration factor. Initial calibration would have determined this +0.2 degree offset, so the level calibration factor would be set to a −0.2 degree to compensate for it. The input summation then gives (3.2°)+(−0.2°)=(3.0°) 50. Next, the control signal is distributed to each of the PID algorithms, and the correction factors are applied to each signal. If the desired speed, set by the operator, was to travel in the forward direction at 10 feet per minute, it would be measured and summed with the respective control signals. For example, if the left PID Controller was supplying an equivalent correction of −2 ft/min, the left motor control summation could be (−2)+(10)=(8) ft/min. While the right PID Controller would be supplying an equivalent correction of 0 ft/min, so the right motor control summation would be (0)+(10)=(10) ft/min 58. After checking for limitation constraints, this could produce a drive signal of 10 feet per minute for the right motor and 8 feet per minute for the left motor. Due to the right motor rotating faster than the left, the crawler will begin to position itself towards the apex of the pipe.

Overall speed is still manually controlled by the operator; however, the compensating speed required for reorientation control is accomplished entirely by the software process as explained in motor control selections above. Following the PID calculations, the signals are again adjusted using a windowing function. The respective signals are then fed back to the controllers of each of the two motors. This allows the motor controllers to adjust the speed of the appropriate motor in order to continually reorient the drive unit to a more horizontal position as the crawler travels along the pipe. As with the angular information, the speed of each motor is also displayed to the operator. Both left and right motors posses their own unique areas of the software for data processing.

As shown in the control block diagram, FIG. 4, this process is continuous and through a function of the software, quickly becomes more accurate as historical data is accumulated. Note that the solid lines represent electrical signals and the dashed lines represent mechanical signals. This block diagram shows the system interactions described in flow chart of FIGS. 3A, 3B, and 3C. This diagram shows the continuous control loop with independent control for each motor. The overall result is a consistent, straight-line path for the crawler for straight pipe and the automatic correction for negotiating curves introduced into the crawler path by elbows in the pipeline.

FIG. 5 shows crawler 10 set on a pipe 100 to be inspected. Initial setup begins with wheel adjustments 28 of FIG. 1, set to the proper pipe diameter 102 and placing crawler 10 at a position relatively close to apex of pipe 108 being inspected. Next, supports 36, of FIG. 2 are mounted to crawler chassis 12. Cables 32 are then connected and support brackets and radiography equipment are attached. At this point, initial assembly for crawler 10 is completed.

As shown in FIG. 2, the scanning gear needs to be mounted and calibrated. Radiographic source 104, of the proper strength, is then placed onto crawler chassis 12 and all required connections for its operation made. Radiographic sensor module 106 is then attached to support brackets 36 opposite from radiographic source 104 and aligned for optimum data collection. Prior to the actual data scan, all radiographic equipment must be calibrated for pipe wall thickness, pipe contents, and source strength.

Powering up computer 30 with the control software is then accomplished. After computer 30 is powered, the power to control unit (CU) 34 is applied by switching the "Power" selector switch. This allows the CU power forms to come up. Position sensor 26 in EU 24 of crawler 10 is also powered-up and begins sending position information back to CU 34 to ultimately be read and processed by the control software. The initial positioning of crawler 10 is detected and the software immediately responds with appropriate motor control signals. Pressing the "Start" momentary pushbutton, allows the motor control circuitry in EU 24 to power-up and begin operating. With the motor drive circuitry operational, crawler 10 begins to traverse pipeline 100. As crawler 10 traverses pipeline 100 it provides forward motion with individual motor speed adjustments as needed to position itself at the apex of pipe 100. Position sensor 26 provides the necessary feedback to close the control loops. During the motion of crawler 10, the scan may begin. The scanning takes place at the proper speed for the specific operation. At the onset of each scan, radiation strength readings are taken at the appropriate safety radius to insure against overexposure to personnel in the area. As the scan proceeds, the data is collected in the software of the computer on a real time basis and stored. The scan can be the same computer as crawler control computer 30 or a different computer (not shown).

All pipe that is scanned utilizes vertical supports at various distance spacing. As crawler 10 reaches these supports, scanning must stop, brackets must be adjusted or removed and crawler 10 advanced across into the next segment of suspended pipe. The brackets are then repositioned by the technician at the crawler 10 or by the operator at the CU 34 and scanning resumes. References to specific locations on the pipe can be accomplished with visible markings attached to the pipe which become a permanent part of the scan data or an encoder may be utilized for data correlation (not shown). Once the data collection has been completed, the information can be stored on disc for customer evaluation.

Once a scanning job is complete, the hardware is then dismantled, cables removed and all equipment returned to the data processing mobile unit.

By using the present system the entire pipeline can be scanned. Prior to the embodiments of the disclosed invention, the entire pipeline was not able to be traversed. Pipe corners needed complete breakdown of the system and reassembly on next pipeline segment.

This system can be utilized on any pipeline in which standard means of internal corrosion verification cannot be used. Some examples of specific applications are pipe with contents beyond the acceptable thermal range of standard equipment, extreme cost of stopping content flow and emptying the pipeline, and pipelines carrying hazardous contents.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the embodiments of the invention have been described in detail with particular reference to these embodiments, other embodiments can achieve the same results. Variations and modifications of the embodiments of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method of maintaining a position of a crawler on an apex of a pipe, the method comprising the steps of:
   a) measuring an incline of the crawler;
   b) sending the measured incline to a computer;
   c) calculating a speed of at least one wheel driving motor to keep the crawler on the apex of the pipe based on the measured incline, wherein the step of calculating a speed comprises adding a calibration factor; and
   d) driving the at least one wheel driving motor at the calculated speed.

2. he method of claim 1 wherein the step of calculating a speed comprises using a proportional-integral-derivative controller.

3. The method of claim 1 wherein the step of driving the at least one wheel driving motor comprises independently driving a left wheel and a right wheel at independent speeds.

4. The method of claim 1 further comprising the step of filtering the measured incline.

5. The method of claim 1 further comprising the step of continuously repeating steps a) through d).

6. A system for maintaining a position of a crawler on an apex of a pipe, the system comprising:
   means for measuring an incline of the crawler;
   means for sending the measured incline to a computer;
   means for calculating a speed of at least one wheel driving motor to keep the crawler on the apex of the pipe based on the measured incline, wherein the means for calculating a speed comprises a calibration factor; and
   means for driving the at least one wheel driving motor at the calculated speed.

7. The system of claim 6 wherein the means for calculating a speed comprises a proportional-integral-derivative controller.

8. The system of claim 6 wherein the means for driving the at least one wheel driving motor comprises a means for independently driving a left wheel and a right wheel at independent speeds.

9. The system of claim 6 further comprising a means to filter the measured incline.

10. A computer program product, comprising:
    computer readable medium comprising:
    code for causing a crawler to maintain a position on an apex of a pipe, the computer code comprising:
    code for causing an incline of the crawler to be measured;
    code for causing the measured incline to be sent to a computer;
    code for causing a speed of at least one wheel driving motor be calculated to keep the crawler on the apex of the pipe based on the measured incline, wherein the code for causing a speed be calculated comprises code for causing a calibration factor to be added; and
    code for causing the at least one wheel driving motor be driven at the calculated speed.

11. The computer program product of claim 10 wherein the code for causing a speed to be calculated comprises using a proportional-integral-derivative controller.

12. The computer program product of claim 10 wherein the code for causing the at least one wheel driving motor to be driven comprises code for causing independent driving of a left wheel and a right wheel at independent speeds.

13. The computer program product of claim 10 further comprising code for causing continuous measurement of the incline and calculating a speed of the at least one driving motor.

14. A system for scanning pipes using a crawler, the system comprising:
    a chassis;
    four tires comprising adjusting apparatuses for configuring the four tires for a specified sized pipe, wherein the four tires comprise solid tires with predetermined material removed for damping and traction;

at least one drive motor for independently driving at least two of the four tires;

at least one position sensor disposed in the chassis;

a controller for driving the at least one drive motor and for keeping the crawler on an apex of the pipe based on data from the position sensor; and a pipe scanner affixed to the chassis.

15. The system of claim 14 wherein said at least one position sensor comprises at least one inclinometer.

16. The system of claim 14 wherein said at least one drive motor comprises a left drive motor and a right drive motor.

17. The system of claim 14 wherein said controller comprises a proportional-integral-derivative controller.

* * * * *